(12) United States Patent
Schreier et al.

(10) Patent No.: US 7,133,570 B1
(45) Date of Patent: Nov. 7, 2006

(54) CALIBRATED SENSOR AND METHOD FOR CALIBRATING SAME

(75) Inventors: Hubert W. Schreier, Columbia, SC (US); Michael A. Sutton, Columbia, SC (US)

(73) Assignee: Correlated Solutions, Inc., West Columbia, SC (US)

( * ) Notice: Subject to any disclaimer, the term of this patent is extended or adjusted under 35 U.S.C. 154(b) by 825 days.

(21) Appl. No.: 10/359,884

(22) Filed: Feb. 6, 2003

(51) Int. Cl.
*G06K 9/64* (2006.01)
*G06K 9/32* (2006.01)
*G06K 9/68* (2006.01)

(52) U.S. Cl. ..................... 382/278; 382/295
(58) Field of Classification Search ........ 382/276–278, 382/218, 295, 312–314; 235/462.49, 472.03; 702/29; 358/473; 356/335–338; 250/203.1, 250/222.2, 573, 574
See application file for complete search history.

(56) References Cited

U.S. PATENT DOCUMENTS

| | | | |
|---|---|---|---|
| 5,090,803 A * | 2/1992 | Ames et al. | 356/139.03 |
| 5,301,243 A * | 4/1994 | Olschafskie et al. | 382/314 |
| 5,574,804 A * | 11/1996 | Olschafskie et al. | 382/313 |
| 6,455,830 B1 * | 9/2002 | Whalen et al. | 250/203.1 |
| 6,794,671 B1 * | 9/2004 | Nicoli et al. | 250/574 |
| 6,803,997 B1 * | 10/2004 | Stanek | 356/2 |
| 2005/0021244 A1 * | 1/2005 | Nicoli et al. | 702/29 |

* cited by examiner

*Primary Examiner*—Amir Alavi
(74) *Attorney, Agent, or Firm*—Michael A. Mann; Nexsen Pruet, LLC

(57) ABSTRACT

For an optical sensor, a simple approach to obtain a mapping function that transforms sensor coordinates of a generic imaging system to coordinates of a virtual, projective camera. The sensor plane of this virtual camera is established using a planar calibration object and does not require known features on the object. Two in-plane motions are sufficient to establish the distortion-free virtual camera. The sensor plane of the virtual projective camera is used to calibrate all subsequent images obtained by the optical sensor. For a generic sensor, the present method is a simple approach to obtain a mapping function that transforms sensor measurements into a virtual sensor system. The virtual sensor system is established using a uniform bias. The virtual sensor system is used to calibrate all subsequent measurements obtained by the sensor.

18 Claims, 3 Drawing Sheets

CALIBRATED SENSOR AND METHOD FOR CALIBRATING SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

A problem familiar to every engineer is that many physical quantities cannot be measured directly. Instead, the response g(x) of a measurement system, such as a sensor, to physical quantities x is measured. Here, the term "sensor" refers to any system with response g(x) to a physical quantity x. For an optical system, the "sensor" may be any combination of lenses, mirrors, prisms, filters and physical sensing elements that comprise the imaging system. Thus, the relationship between the physical quantity and the response function for the sensor may not be linear. For best results, the sensor must be calibrated by linearizing the reponse to produce the calibrated output. Calibration requires the determination of the inverse of g.

Typically, calibration functions are determined by providing the sensor with a series of known inputs $x_i$ while recording the corresponding output of the measurement system $g_i$. This approach works well if the system response g(x) is very nearly linear or of low order, and the system can be excited with accurate knowledge of $x_i$. If g(x) is not well characterized by a low-order function, a direct calibration will require a substantial number of calibration pairs ($g(x_i)$, $x_i$) to establish the local variations of g. Furthermore, the requirement to know the input x accurately is not always practical. Thus, there remains a need for an easier way to calibrate a sensor.

SUMMARY OF THE INVENTION

According to its major aspects and briefly recited, the present invention is a method for making a calibrated sensor and a method for calibrating a sensor. While the present method applies especially well to optical sensors, it is not limited to optical sensors.

The present method comprises, for an optical sensor, making three "readings" or, in the case of optical sensors, three images of a physical planar object with a sensor. The second and third of the three images are taken following small translations of the sensor with respect to the planar object used for the first image, the third image being taken following a translation orthogonal to the second. The three images are correlated to determine the translations of each point on the planar object. Then, a mathematical algorithm is applied to the results of translating these un-calibrated images to derive a function that best fits the translation data, and then the inverse to that function, which is a calibration function that can be used to produce a virtual planar object from the physical planar object. The calibration function linearizes the output of any image obtained using the sensor. Particular output images of the sensor can be linearized apart from the sensor, or, by incorporating the calibration function into the sensor's output programming, all sensor output will be automatically linearized. The result is a calibrated sensor.

An important advantage of this invention is the lack of a need for specific planar objects or special equipment to calibrate a sensor. This advantage frees up the user to use whatever objects and equipment is convenient for calibrating a sensor according to the present method.

Another advantage of the present method is that it is not based on or derived from a particular type of sensor. This permits the calibration of the type of sensors that may be producing a non-linear output.

Still another important advantage of this method is that it allows sensors that are of lesser quality to be used in circumstances where better quality sensors would otherwise have to be used, or where high quality sensors would be highly desirable. This advantage translates into lower cost sensors or the ability to use more sensors of lower quality for the same cost as fewer high quality sensors. Typically as sensor quality increases, cost of the sensor increases more rapidly. Here, the incremental cost of a better sensor may be obtained at a lower incremental cost.

Yet another feature of the present invention is that for two-dimensional images, such as those obtained using an optical sensor, only two translations from the original image are required for calibration. This feature makes the present invention faster than prior calibration methods.

These and other features and their advantages will become apparent to those skilled in the art of sensor design and manufacture from a careful reading of the Detailed Description of Preferred Embodiments, accompanied by the following drawings.

DETAILED DESCRIPTION OF PREFERRED EMBODIMENTS

Figure 1:
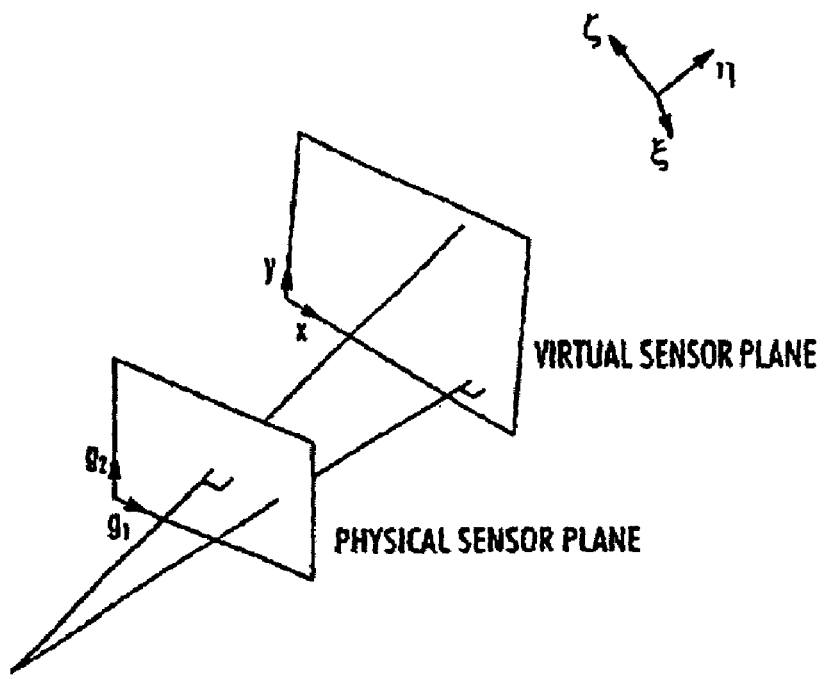
FIG. 1 illustrates simply the relationship between the physical sensing elements, or array, in the physical sensor and a virtual sensor plane created by the present algorithm. The physical sensing array may (a) have curvature in one or two directions and be quite general in shape, b) be skewed but planar in shape or (c) be planar with two orthogonal directions. The present algorithm can be used to calibrate a sensor with any type of sensor array, according to a preferred embodiment of the present invention.

The present invention will be described in connection with an optical sensor, partly for convenience and partly because the present invention works well with optical sensors, but the present invention is not limited to optical sensors. As noted previously, the term "senor" is intended to include any combination of imaging elements and physical sensing elements such as photodiode arrays, as well as a great many transducers. Any measurement system that would inherently have distortion, that is, non-linear response, can benefit from the present method.

The present method requires use of the sensor to obtain several images of a planar object; each image is obtained following a translation relative to the object by a small distance from the preceding one, as a prerequisite to deriving the calibration function. These translations must be (1) in the same plane as the planar object and (2) non-parallel, and preferably orthogonal. Non-parallel movements have orthogonal components with respect to each other. For convenience, in the present specification, "orthogonal" is used to include both strictly orthogonal movements (i.e., 90° or 270° from the direction of a previous movement) and non-parallel movements (other than 0° or 180°). These two translated images are correlated to the original image, and then the movements of each point on the planar image are used to derive a function that best fits the translation data. A common process for deriving the function is to use either a Taylor series-based formulation or a B-spline series formulation, but other approaches are also applicable (e.g., wavelet methods, Lagrangian polynomials). The inverse of this function is the calibration function for the sensor that was used to obtain the image. When the calibration function is used to transform the sensor's response function for any image obtained by that sensor, the result is linearized, calibrated output from the sensor. Images obtained from the calibrated sensor are essentially undistorted, determining and accounting for imperfections in both imaging elements and also the physical sensing array. Once the correlation function is known, it can be used to linearize any image obtained by the sensor, preferably to automatically linearize it. That two translated images can be used to calibrate a sensor requires proof, which follows below.

In some instances, it may be more convenient to use a series of calibration pairs $(g(x_i), x_i)$, where the $x_i$ are unknown. In this case, however, an inverse of g cannot be found without additional constraints. However, suppose several series of calibration pairs $(g(x_i+\Delta x_j), x_i+\Delta x_j)$ can be obtained by uniformly biasing the original $x_i$. If a function $f$ can be found that fulfills $$f(g(x+\Delta x)) - f(g(x)) = \Delta x \quad \forall \Delta x, \tag{1}$$

then $f(g)=x+c$ is the inverse of $g(x)$ up to the addition of a constant.

This statement can be proved by contradiction as follows. It is noted that $g(x)$ has to be a strictly monotonic function, i.e. it has to be invertible, to make unambiguous measurements possible. Let $h(g)$ be the inverse of $g(x)$. Suppose a function $f(g)$ that fulfills eq. (1) is not the inverse of g up to the addition of a constant. Then, $f(g)$ can be expressed as the addition of a non-constant function $a(g)$ to the inverse $h(g)$:

$$f(g) = h(g) + a(g). \tag{2}$$

By substituting eq. (2) into eq. (1), one obtains $$h(g(x+\Delta x)) + a(g(x+\Delta x)) - h(g(x)) + a(g(x)) = \Delta x$$

$$x + \Delta x + a(g(x+\Delta x)) - x - a(g(x)) = \Delta x$$

$$a(g(x+\Delta x)) - a(g(x)) = 0 \quad \forall \Delta x. \tag{3}$$

Since $g(x)$ is a strictly monotonic function, $g(x+\Delta x)$ sweeps the entire range of possible g for any fixed x and varying $\Delta x$, and eq. (3) can only be fulfilled if $a(g)$ is a constant, which contradicts the assumption and proves the hypothesis.

From a practical standpoint, the requirement to fulfill eq. (1) for all possible $\Delta x$ appears rather strict, since a large number of calibration series would have to be acquired. The question arises as to whether a function $f(g)$ that fulfills eq. (1) for a single $\Delta x$ can still be considered the inverse of $g(x)$. This is not generally the case, as can be seen from eq. (3). For example, if $g(x)=x$, the inverse of g can only be obtained up to the addition of a constant and an arbitrary periodic function of period length $\Delta$ from a single $\Delta x$. However, this ambiguity can easily be resolved by constraining the calibration function sought for, or by using two series with different bias $\Delta x_j$ that are not an integer multiple of each other.

It is noted that if the bias $\Delta x_j$ is not accurately known (or is completely unknown), the calibration function $f(g)$ can only be determined up to an unknown scale factor and a constant addition, i.e. $f(g)=sh(g)+c$.

In order to find an approximation for $f(g)=x$ from measurement data, several approaches are considered. If $\Delta g=g(x+\Delta x)-g(x)$ is small, i.e., a small bias $\Delta x$ is used, the left-hand side of eq. (1) can be approximated by a first-order Taylor development, and one obtains $$f(g(x+\Delta x)) = (df/dg)(g(x+\Delta x) - g(x)) \tag{4}$$

and thus a non-linear differential equation is obtained using (1) and (4):

$$\frac{df}{dg} = \frac{\Delta x}{g(x+\Delta x) - g(x)} \tag{5}$$

Using the two sets of calibration equations above, this equation can be numerically integrated and an approximation for $f(g)=x$ can be obtained with an additional boundary condition from the measurement of a single point. If such a point-measurement is not available, the calibration function can only be obtained up to a constant addition, and an arbitrary boundary condition can be imposed, e.g. $f(g')=0$, where g' is an arbitrary point.

The quality of this approximation will largely depend on the accuracy of the measurements $g(x_i+\Delta)$ and $g(x_i)$, as well as how well $f$ can be approximated by a Taylor-series polynomial in the range $\Delta g=g(x_i+\Delta)-g(x_i)$. The disadvantage of this simple approach is that measurement error is integrated and thus propagated, and that the use of the Taylor series polynomial is limited to small bias $\Delta x$.

It is therefore preferable to choose a suitable calibration function $f(g, p)$, where p is a parameter vector, and find the optimal parameter set p such that $f(g, p)$ fulfills eq. (1) in a least-squares sense. If the response of sensor $g^j$ is measured for different amounts of (unknown) bias, $\Delta x_j$, a calibration function can be obtained by solving the following minimization problem:

$$\sum_j \sum_i (f(g_i^j, p) - f(g_i^0, p) - c_j)^2 \to \min \tag{6}$$

subject to the constraints $$f(g') = 0 \quad (6)$$

$$f(g'') = 1. \quad (7)$$

In this formulation, the scale factor s is fixed by the additional constraints at two points g' and g", which can be arbitrarily chosen, and the bias $c_j = s\Delta x_j$ can be found as part of the minimization process. If a uniform B-spline polynomial is chosen for the calibration function according to $$f(g, p) = \sum_{k=0}^{M} p_k N_k(g), \quad (8)$$

the calibration parameters $p_k$ are B-spline coefficients and $N_k(g)$ are B-spline kernel functions. In this case, the minimization problem results in a linear equation system for the calibration parameters, the unknown bias $c_j$ as well as two Lagrangian multipliers $\lambda_{1/2}$ used to enforce the equality constraints at g' and g". Let $$D_{pq} = \sum_j \sum_i (N_p(g_i^j) - N_p(g_i^0))(N_q(g_i^j) - N_q(g_i^0)) \text{ and} \quad (9)$$

$$E_{pj} = -\sum_i (N_p(g_i^j) - N_p(g_i^0)). \quad (10)$$

Then, the equation system for the calibration parameters is given by $$\begin{bmatrix} D_{00} & D_{01} & \ldots & D_{0M} & E_{00} & \ldots & E_{0N} & N_0(g') & N_0(g'') \\ \ldots & D_{11} & \ldots & D_{1M} & E_{10} & \ldots & E_{1N} & N_1(g') & N_1(g'') \\ \vdots & \vdots & \vdots & \vdots & \vdots & \vdots & \vdots & \vdots & \vdots \\ \ldots & \ldots & \ldots & D_{MM} & E_{M0} & \ldots & E_{MN} & N_M(g') & N_M(g'') \\ \ldots & \ldots & \ldots & \ldots & \sum 1 & \ldots & 0 & 0 & 0 \\ \vdots & \vdots & \vdots & \vdots & \vdots & \vdots & \vdots & \vdots & \vdots \\ \ldots & \ldots & \ldots & \ldots & \ldots & \ldots & \sum 1 & 0 & 0 \\ \ldots & \ldots & \ldots & \ldots & \ldots & \ldots & \ldots & 0 & 0 \\ \ldots & \ldots & \ldots & \ldots & \ldots & \ldots & \ldots & & 0 \end{bmatrix} \begin{Bmatrix} p_0 \\ p_1 \\ \vdots \\ p_M \\ c_0 \\ \vdots \\ c_N \\ \lambda_1 \\ \lambda_2 \end{Bmatrix} = \begin{Bmatrix} 0 \\ 0 \\ \vdots \\ 0 \\ 0 \\ \vdots \\ 0 \\ 0 \\ 1 \end{Bmatrix} \quad (11)$$

A common model used to describe real cameras is that of a pinhole or projective camera. This very simple model is typically improved to account for certain types of lens distortions (e.g. radial, small prism). However, in cases wherein aberrations cannot be described by simple functions (e.g. optical microscopes, fiber-shearing in fiber-optically coupled photo multipliers, non-planar sensor plane, etc.), or wherein the imaging process is not well described by the pinhole model to begin with (e.g. fish-eye lenses), accurate camera calibration cannot be easily achieved using traditional methods. The present invention is a method for easily establishing a virtual, projective camera using the above development. For optical sensors, the technique requires a flat calibration object to produce a virtual sensor plane.

FIG. 1 shows the model of a pinhole camera to illustrate the relationship between the physical planar object and the virtual planar object. Coordinates in the physical sensing array are denoted by $(g_1, g_2)$ and global coordinates are described in a $(\xi, \eta, \zeta)$-coordinate system.

The physical camera is not assumed to be an ideal pinhole camera. However, it is assumed that some unknown mapping function exists that can be used to convert the distorted or non-linear camera coordinates into coordinates of an ideal camera, i.e. the image formed on the physical sensing is the result of an uneven sampling of the ideal image. Another interpretation is that the image formation is assumed to be the result of an even sampling of the incoming bundle of rays in a curvilinear coordinate system of a three-dimensional sensing array surface. It is noted that in traditional calibration techniques, the mapping function that converts distorted coordinates to ideal sensing array coordinates is assumed to be of a known type, e.g. first-order radial distortion, and distortion coefficients are found during the calibration process.

Also shown in the figure is a virtual sensor plane denoted by (x,y)-coordinates. The relationship between virtual sensor coordinates x and global coordinates $(\xi, \eta, \zeta, 1)$ can be expressed as $$\bar{x} \simeq \begin{bmatrix} f_x & s & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{Bmatrix} \xi \\ \eta \\ \zeta \\ 1 \end{Bmatrix}, \quad (12)$$

where the $r_{ij}$ are components of a rotation matrix relating the virtual camera and global coordinate systems and the $t_i$ represent the translation vector relating the two coordinate systems. The intrinsic parameters of the camera are the focal lengths $f_x$ and $f_y$, thee skew factor s, and the location of the principal ray $(c_x, c_y)$. Both the intrinsic and the extrinsic parameters of the virtual camera can be found using well-established techniques, if the mapping function from physical to virtual sensor coordinates can be found. These techniques are described, for example, in Tsai, R. Y., A Versatile Camera Calibration Technique for High Accuracy Machine Vision Metrology Using Off-the-Shelf TV Cameras and Lenses, IEEE Journal of Robotics and Automation, 1987, and Zhang, Z., A Flexible New Technique for Camera Calibration, MSR-TR-98-71, 1998.

To establish the relation between physical sensing array coordinates and coordinates in a virtual sensor plane, the technique of uniformly biased point correspondences developed above can be used. For this application, a uniform bias can be achieved by in-plane translations of a calibration plane, and point-correspondences can be established by means of well-known digital image correlation or similar techniques. However, since the two-dimensional coordinates of a position in the physical optical sensing array are a function of the x- and y-coordinate in the virtual sensor or calibration plane, the calibration technique developed above first has to be extended to accommodate the two-dimensional calibration problem.

For a two-dimensional sensor, the calibration problem becomes that of finding two inverse mapping functions $f_1(g_1, g_2)=x$ and $f_2(g_1,g_2)=y$. For the moment, assume that the calibration plane and the direction of translation can be aligned in a manner such that all image points remain on the same horizontal scan-line after translation. If the x-direction on the virtual sensor plane is chosen to coincide with the direction of motion, a calibration functions $f_1$ for the x-coordinate on the virtual sensor plane can be found for any scan-line using the methods described above. However, for each scan-line, arbitrary boundary conditions have to be imposed, since the image of the y-axis is unknown. Therefore, $f_1(g_1, g_2)$ can only be determined up to an arbitrary function $a(g_2)$.

To resolve this ambiguity, a second, orthogonal motion can be used (meaning, as noted above, a second motion having an orthogonal component with respect to the first motion). The direction of the orthogonal motion will be the y-direction of the virtual sensor, and one can write $$f_1(g_1(x+\Delta x, y), g_2(x+\Delta x, y)) - f_1(g_1(x,y), g_2(x,y)) = \Delta x \quad (13)$$

for the first motion, and for the perpendicular motion one can write $$f_1(g_1(x,y+\Delta y), g_2(x,y+\Delta y)) - f_1(g_1(x,y), g_2(x,y)) = 0 \quad (14)$$

In a similar manner, one can write two equations for the second inverse mapping function $f_2(g_1, g_2)=y$ using the same two motions:

$$f_2(g_1(x+\Delta x, y), g_2(x+\Delta x, y)) - f_2(g_1(x,y), g_2(x,y)) = 0 \quad (15)$$

and $$f_2(g_1(x, y+\Delta y), g_2(x, y+\Delta y)) - f_2(g_1(x,y), g_2(x,y)) = \Delta y. \quad (16)$$

It is noted that concepts embodied in Eqs (13–16) can be used to develop a modified equation set that can be used to obtain calibration functions for arbitrary orientations of the calibration plane and arbitrary directions of motion, as long as the two motions are non-parallel.

By choosing separable uniform B-spline functional forms for the calibration functions, an equation system of the same form as eq. (11) can be used to solve the calibration problem. The only difference is that the $E_{pj}$ are zero for points corresponding to a bias $\Delta y(\Delta x)$ when solving for $f_1(f_2)$.

The problem of finding a mapping function between coordinates in an image of a planar object and a coordinate system in the object plane using two perpendicular motions has a simple geometric interpretation. Consider two images of a plane that has been translated by a small amount $\Delta x$. By selecting an arbitrary point $(g_1^0, g_2^0)$ in the first, motion-free image as the image of the origin of the coordinate system on the object plane, one obtains a first point that lies on the x-axis of the object coordinate system. The image of a second point, $(g_1^1, g_2^1)$ with coordinates $(\Delta x, 0)$ can immediately be found by locating where the original point has moved to in the translated image, e.g. by means of digital image correlation. A third point $(g_1^2, g_2^2)$ corresponding to object coordinates $(2\Delta x, 0)$ can be found by finding the displacement between where the point located $(g_1^1, g_2^1)$ in the motion-free image has moved to in the translated image e.g. by means of digital image correlation. By repeating this process, a series of correspondences between the x-axis $(i\Delta x, 0)$ and the image of the x-axis $(g_1^i, g_2^i)$ can be established.

A similar process can be used to establish the image of the y-axis from a third image corresponding to a translation of the calibration plane by a small $(0, \Delta y)$. By repeating this process, a series of correspondence between the y-axis $(0, j\Delta y)$ and images of the y-axis can be established. This process can not only be applied using the image of the origin as a starting point, but can also be applied to any of the image points corresponding to $(0, j\Delta y)$. In this manner, the mapping function can be found for a grid covering the entire image area.

A Nikon SMZU stereo-microscope is a suitable tool for small-scale deformation measurements using three-dimensional image correlation. It features two ports for attaching CCD—cameras and a wide range of magnification from 1.5:1 to 15:1. However, the microscope suffers from system distortions that cannot be described by traditional distortion functions. Even though these distortions are relatively small and cannot be noticed by the eye, they introduce considerable bias in fine measurements such as are required for accurate deformation measurements.

To show the applicability of the proposed calibration method, a series of images of a flat glass slide prepared with a toner-powder speckle pattern was acquired. To establish the mapping functions, translations of 250 μm along perpendicular axes were introduced by means of a 2-axes translation stage. The displacement between the reference image and the biased images was calculated using digital image correlation. The mapping functions were obtained from the displacement fields using cubic B-splines with the method described above. The coordinate range in the virtual sensor plane was scaled to produce coordinates in the same range as the pixel coordinates using appropriate boundary conditions.

A series of images with different motions of the calibration plane was acquired. The direction of motion was approximately aligned with the scan-lines of the image. Where necessary, the response function was scaled to the same scale as the first planar image acquired. The displacements between the first image of the sequence and each of the successive images were calculated using digital image correlation. The calculated displacements were then transformed to the virtual sensor plane using the mapping functions found during calibration.

Figure 2:
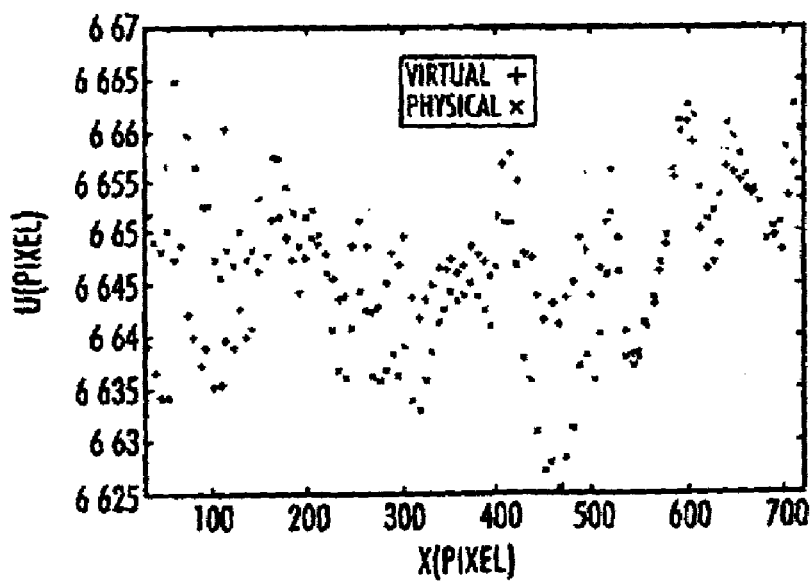
FIG. 2 is a graph showing displacement measured in pixels as a function of pixel location for a small motion in an example suitable for use of the present invention.
Figure 3:
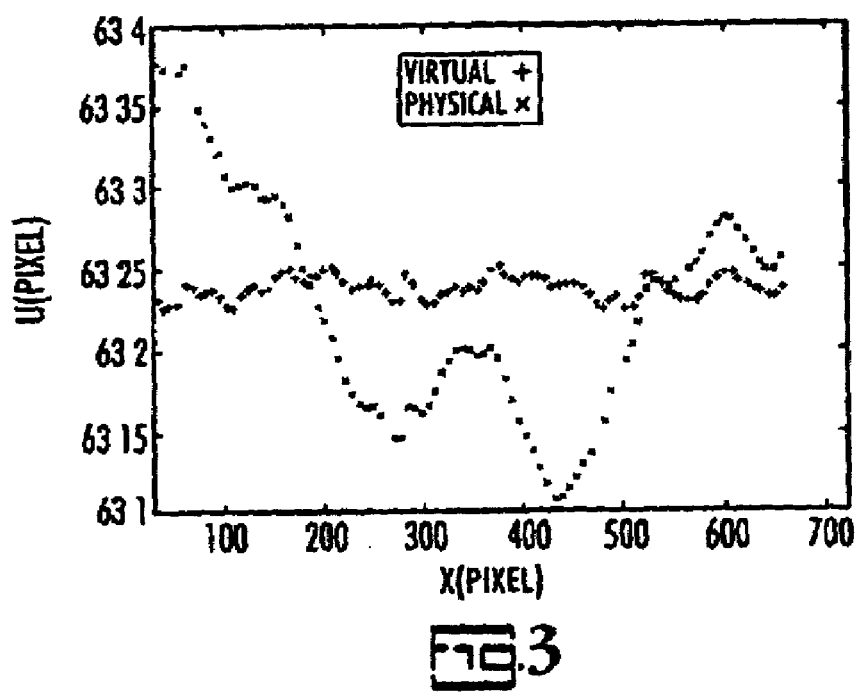
FIG. 3 is a graph showing sensor displacement measured in pixels for pixel locations in a physical sensing array versus pixel locations in a virtual plane for a medium-sized displacement, according to a preferred embodiment of the present invention.
Figure 4:
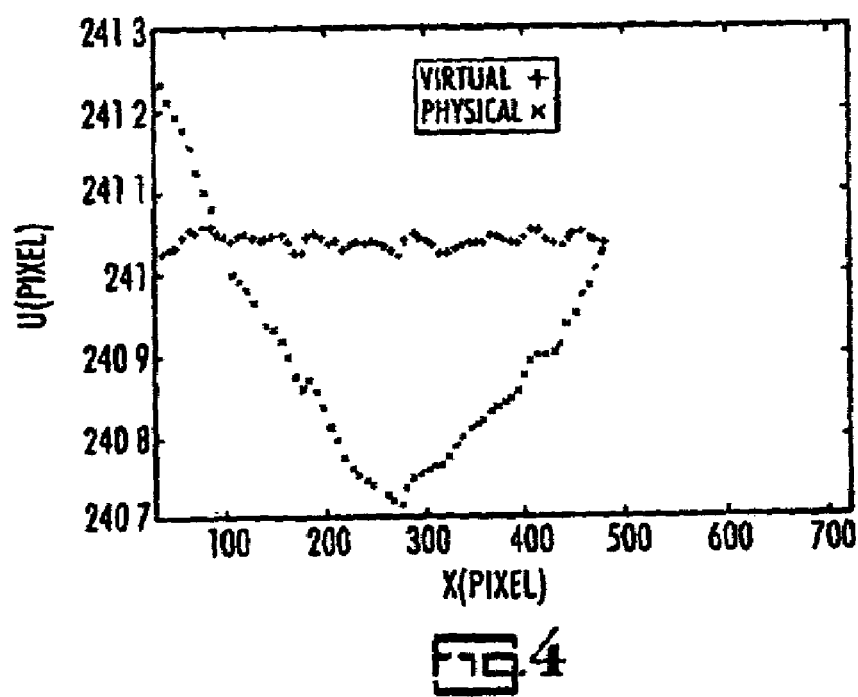
FIG. 4 is a graph showing sensor displacement measured in pixels for pixel locations in a physical sensing array versus pixel locations in a virtual plane for a large-sized displacement, according to a preferred embodiment of the present invention.

FIGS. 2, 3, and 4 compare the displacements in physical sensor and virtual sensor coordinates for a relatively small, a medium, and a large motion for a scan-line in the center of the image. The figures clearly illustrate that the mapping functions produce accurate results for arbitrary motions, even though they were found using a relatively small motion. The displacements in physical sensor coordinates exhibit extreme distortion, and the mapping functions accurately compensate for them.

Figure 5:
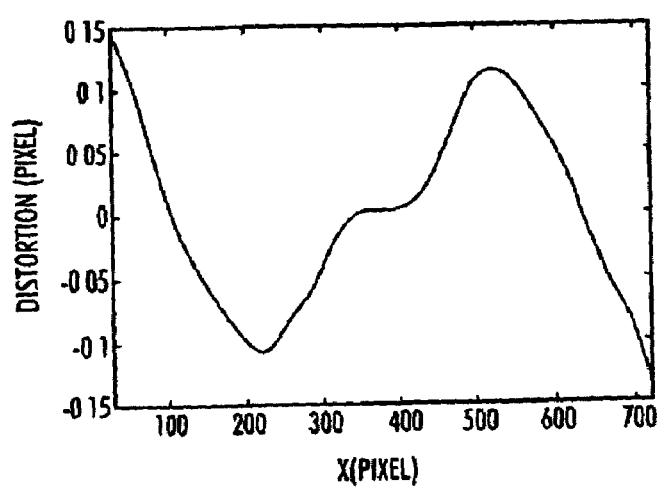
FIG. 5 is a graph illustrating the residual between mapping function and a best-fit homographic mapping for a scan line in the center of the image.

To illustrate the nature of the distortions in the microscope, the difference between the mapping function and the best-fit homographic mapping was calculated for the same scan-line. While this difference does not represent the actual distortions, since the best-fit homography will compensate for asymmetry in the distortion, it can give some indication of the nature of the distortions. The graph in FIG. 5 shows the residual between the mapping function and the best-fit homographic mapping. It is apparent that this type of distortion cannot be accurately modeled by traditional distortion functions, because complex distortion function varies less than 0.3 pixel over a large number of pixels.

A series of images of a calibration grid in different orientations was acquired. The grid intersections in the images of the left and right microscope port were found and converted to virtual sensor plane coordinates using the respective mapping functions. Then, a calibration technique, similar to that taught by Zhang in the reference cited above, was used to first calibrate each virtual camera and then calibrate the two virtual cameras' relative orientations. The two virtual cameras' relative orientations are of particular interest, since the two virtual sensors should theoretically be in the same plane. The calibration parameters obtained show that this is actually the case with reasonable accuracy, and the two virtual cameras were found to be in the same plane within 0.5°.

The calibration technique presented is capable of accurately compensating for arbitrary lens distortions, as well as other system imperfections, that cannot be characterized by simple distortion equations. Using two perpendicular motions of a planar object, a distortion-free virtual sensor plane can be established and used to produce substantially undistorted output from an otherwise distorted sensor.

To make a calibrated sensor, an un-calibrated sensor is obtained, the calibration method described above is applied to obtain the calibration function, and then the sensor is modified to apply the calibration function to the sensor's response function prior to outputting data from the sensor. The output data is then corrected by the calibration function and the system outputting the data thus constitutes a calibrated sensor.

The sensor can be modified in a number of ways to apply the calibration function to its output depending on the type of sensor. Typically, a first microprocessor in a microchip can be incorporated into the sensor physically in order to apply the calibration function to the signal output directly so that the to produce the calibrated signal output. Alternatively, a "stand-alone" microprocessor can perform the programming function. For example, a camera mounted on a satellite can beam images to a station on earth where a computer microprocessor in communication with the satellite camera calibrates the signals prior to retransmission. In an industrial environment, signals from multiple sensors can be received in a programmed general-purpose computer that calibrates the signals and displays the output.

It is also possible to use two microprocessors, a first microprocessor to determined the calibration function for the sensor which calibration function is then transferred to a second one in order to apply the calibration function derived by the first. Also, the technique described above can be applied to optical systems other than light-based, such as X-ray-based, radio-telescopes and CAT-scans. It can also be applied to non-optical sensors such as those that process audio signals.

It will be apparent to those skilled in the art of sensor design and manufacture that many modifications and substitutions can be made to the foregoing preferred embodiment without departing from the spirit and scope of the present invention, defined by the appended claims.

The method can be applied to multiple channel sensors, e.g., color cameras, where the channels record data corresponding to different optical wavelengths. By applying the method to the data from each channel, individually, wavelength-dependent calibration function can be obtained and used to remove chromatic aberrations in color images.

What is claimed is:

1. For an optical sensor, a method for calibrating said optical sensor, said method comprising the steps of:
   providing a planar object, said planar object defining a plane;
   obtaining a first image of said planar object using an optical sensor;
   translating said planar object in a first direction in said plane relative to said optical sensor;
   obtaining a second image of said planar object;
   translating said planar object in a second direction in said plane relative to said optical sensor, said second direction being non-parallel to said first direction;
   obtaining a third image of said planar object;
   correlating said first, second and third images of said planar object to obtain translation data;
   generating a response function representing said translation data;
   deriving an inverse function from said response function; and
   applying said inverse function to calibrate subsequent images obtained by said optical sensor.

2. The method as recited in claim 1, wherein said first and said second directions are orthogonal with respect to each other.

3. The method as recited in claim 1, wherein said correlating step further comprises the steps of:
   correlating said first image and said second image; and
   correlating said first image and said third image.

4. The method as recited in claim 1, wherein said generating step further comprises the steps of approximating said response function using a B-spline function form.

5. The method as recited in claim 1, wherein said generating step further comprises the steps of approximating said response function using a Taylor series function form.

6. The method as recited in claim 1, wherein said generating step further comprises the steps of approximating said response function using other function forms.

7. The method as recited in claim 1, further comprising the step of scaling said response function to the same scale as said first planar image.

8. The method as recited in claim 1, further comprising the steps of:
   placing a microprocessor in electrical communication with said optical sensor, programming said inverse function into said microprocessor so that images subsequently obtained from said optical sensor are calibrated automatically.

9. The method as recited in claim 1, further comprising the steps of:
   placing a first microprocessor in electrical communication with said optical sensor;
   determining said inverse function using said microprocessor;
   transferring said inverse function to a second microprocessor connected to said optical sensor; and
   using said second microprocessor to apply said inverse function to images subsequently obtained from said optical sensor.

10. The method as recited in claim 1 applied to each channel in a multi-channel optical sensor, where a multi-channel optical sensor is any optical sensor with multiple responses, $g_i(x)$, to a physical quantity x.

11. The method as recited in claim 10, wherein said generating step further comprises the step of approximating said response function using a B-spline function form.

12. The method as recited in claim 10, wherein said generating step further comprises the step of approximating said response function using a Taylor series function form.

13. The method as recited in claim 10, further comprising the step of scaling said response function to the same scale as said physical quantity.

14. The method as recited in claim 10, further comprising the steps of:
   placing a microprocessor in electrical communication with said sensor; and
   programming said inverse function into said microprocessor so that data subsequently obtained from said sensor are calibrated.

15. The method as recited in claim 10, further comprising the steps of:
   placing a microprocessor in electrical communication with said sensor;
   determining said inverse function on said microprocessor;
   transferring said inverse function to a second microprocessor connected to said sensor so that said second microprocessor applies said inverse function to calibrate said sensor.

16. The method, as recited in claim 1, applied to the combined response, h(x), for multi-channel optical sensor. The combined response, h(x), is constructed from the multi-channel response, $g_i(x)$, by mathematical operations.

17. The method as recited in claim 1, wherein said generating step further comprises the step of approximating said response function using other function forms.

18. A method for calibrating a generic sensor, said method comprising the steps of:
   obtaining initial data using a sensor;
   biasing said sensor;
   acquiring additional data with said biased sensor;
   comparing said biased and unbiased data from said sensor to obtain said bias;
   generating a response function representing said bias;
   deriving an inverse function from said response function;
   applying said inverse function to calibrate data obtained by said sensor.

* * * * *